United States Patent [19]

Wilger et al.

[11] 4,359,917

[45] Nov. 23, 1982

[54] PORTABLE ON-SITE TURNING APPARATUS

[75] Inventors: John F. Wilger, Honolulu; Gregory S. Nakano, Pearl City; Tadao Uyetake, Honolulu; Stephen Orillo, Jr., Mililani Town; Teikichi Higa, Pearl City, all of Hi.

[73] Assignee: The United States of America as represented by the Secretary of the Navy, Washington, D.C.

[21] Appl. No.: 161,615

[22] Filed: Jun. 20, 1980

[51] Int. Cl.³ .............................................. B23B 5/00
[52] U.S. Cl. ......................................... 82/4 R; 82/1.4
[58] Field of Search ........................... 82/4 R, 4 C, 1.4

[56] References Cited

U.S. PATENT DOCUMENTS

| | | | |
|---|---|---|---|
| 1,436,522 | 11/1922 | Pedrick | 82/1.4 |
| 2,769,234 | 11/1956 | Young | 82/4 C |
| 2,796,792 | 6/1957 | Dias | 82/4 R |
| 2,869,411 | 1/1959 | Duprat | 82/4 R |
| 3,141,364 | 7/1964 | Kelley et al. | 82/4 R |

FOREIGN PATENT DOCUMENTS 1331230  9/1973  United Kingdom ................. 82/4 C Primary Examiner—Leonidas Vlachos
Attorney, Agent, or Firm—Robert F. Beers; Ervin F. Johnston; Terrance A. Meador

[57] ABSTRACT

A turning apparatus, intended to be mounted on a work shaft for in-place cutting, may include a pair of mounting rings which are attachable to the shaft and which support a longitudinal annulate frame assembly which rotates about the area to be cut. A drive assembly is mounted on a mounting ring and engages a ring gear attached to the frame assembly for providing it rotational force. A longitudinal track assembly is mounted on and extends between the ends of the frame assembly. A carriage assembly is slidably mounted on the track assembly and is in operational engagement with a lead screw which is also mounted on the track assembly. The carriage assembly is adapted to hold a cutter for machining the shaft surface as the frame assembly rotates. A hydraulic indexing device incrementally rotates the lead screw in synchronism with the rotation of the frame assembly to move the carriage assembly and the cutter along the axis of the work piece.

10 Claims, 14 Drawing Figures

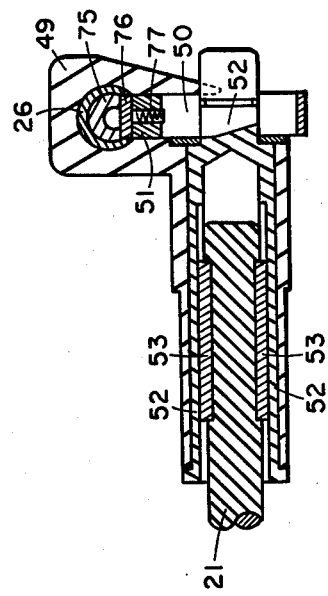
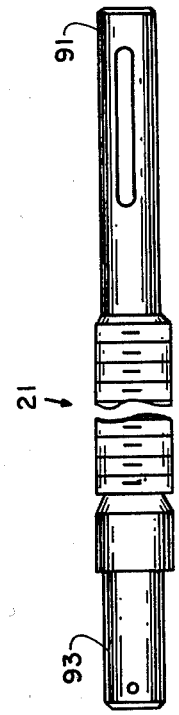
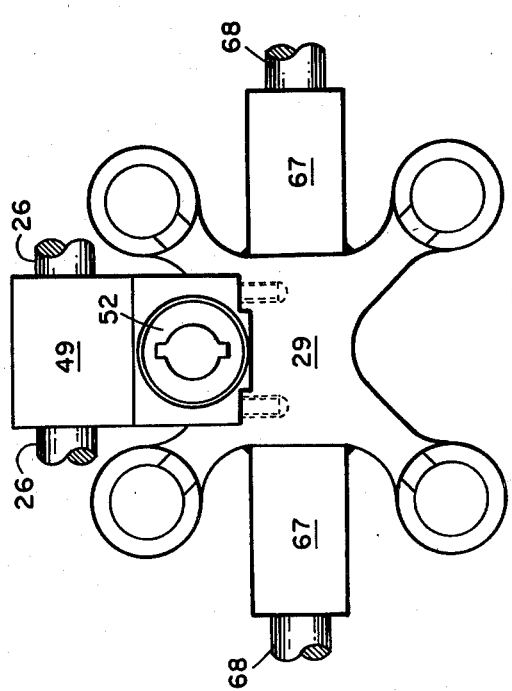

“`
PORTABLE ON-SITE TURNING APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention is related to the field of machining devices which operate by providing relative motion between a cutting blade and a work piece which causes machining of the work piece surface. With still greater particularity, the invention is in the field of cutting machines which provide the relative movement between the blade and the work piece by rotating the blade about the axis of the work piece.

Most maritime vessels are equipped with rudders. A rudder and its mounting post are normally designed as a single unit which is not easily removed or replaced. During the overhaul of vessels, the rudder post is inspected and repaired to maintain maximum functional efficiency. Normally, the journal surface of the post suffers metal fatigue caused by constant operational pressure from the bearing contact; it must be repaired to conform to the manufacturer's geometric tolerances required to maintain navigational accuracy. The refurbishment of the rudder journal area is normally accomplished by a local weld build-up, followed by a hand grinding with pneumatic grinders and sanders, and then by a trial fit-up. This refurbishment sequence must be continuously repeated until a satisfactory surface finish is obtained. The refurbishment of the rudder bearing area by the use of hand tools is slow, tedious, and expensive with the end product being of low quality. Removal of the work piece for machining at a stationary site requires many extra manhours to remove, transport, and reinstall the rudder and post.

SUMMARY OF THE INVENTION

This invention provides a close-tolerance, on-site turning apparatus for in-place machining of worn out journal areas or other external surfaces of rudder posts or other comparable gigantic work pieces. The turning apparatus may include two mounting rings which are concentrically attachable to the work shaft in a spaced relationship. A longitudinal annulate frame assembly having opposite ends is mounted between the mounting rings with each end slidably contacting a mounting ring so that the frame assembly can be coaxially positioned on the work shaft and rotated. A drive assembly comprising a motor and gear box mounted on a mounting ring is operatively coupled to the frame assembly for rotating it. A longitudinal track assembly is mounted on the frame assembly and extends between the ends thereof to be rotated with the frame assembly. A lead screw is rotatably mounted on the track assembly and extends between the ends of the frame assembly. A carriage assembly, adapted to carry a cutter for machining the shaft surface, is mounted on the track assembly for slidable movement therealong. The carriage assembly includes a threaded device to engage the lead screw. A hydraulic indexing apparatus for incrementally rotating the lead screw in synchronism with the rotation of the frame assembly is provided to move the carriage assembly and attached cutter along the axis of the frame assembly by rotation of the lead screw.

OBJECTS OF THE INVENTION

An object of the invention is to provide a turning apparatus for in-place machining of an external work piece surface.

Another object is to provide a power-operated turning apparatus which can be efficiently and reliably utilized for in-place machining of the journal area of a rudder post.

A further object is to provide an annulate frame assembly for an in-place turning apparatus to increase the observation visibility of the machining process and reduce the weight of the turning apparatus.

Yet another object is to provide a frame assembly for an in-place turning apparatus wherein the turning operation is accomplished by rotating the frame assembly with a cutter mounted thereon about the axis of the work piece.

These and other objects of the invention will become more readily apparent from the ensuing description when taken together with the drawings.

DESCRIPTION OF THE DRAWINGS

FIGS. 3a and 3b are sectional views taken along planes AA and BB respectively of FIG. 3.

FIG. 5 is a front view of the bed retainer guide with a mounting bracket and pivot pin spacer mounted thereto.

FIG. 6 is a side view of the lead screw.

DESCRIPTION OF THE PREFERRED EMBODIMENT

Figure 1:
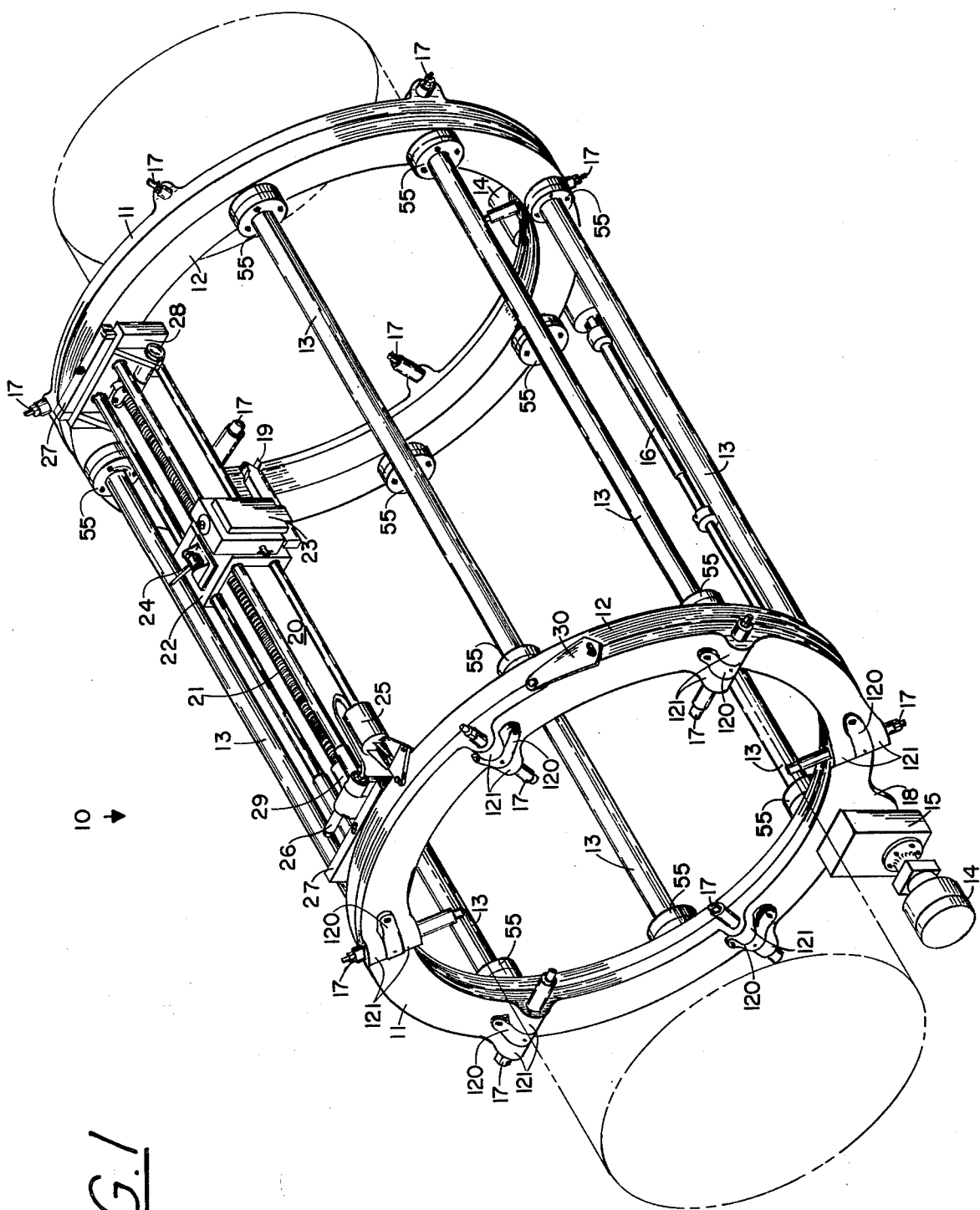
FIG. 1 is a perspective view of the turning apparatus mounted on a work piece for machining the surface thereof.

Referring now to the drawings, wherein like reference numerals designate like or similar parts throughout the several views, there is illustrated in FIG. 1 a turning apparatus 10 which is shown mounted on a phantom work piece for machining an external surface of the piece such as a journal surface. The turning apparatus 10 can comprise mounting rings 11 which include mounting post assemblies 17 adapted to be screwed down to contact the work piece and thereby position the mounting rings 11 coaxially with the piece. A longitudinal annulate frame assembly comprising drive rings 12 and spreader arms 13 is mounted between the mounting rings 11. Each drive ring 12 is slidably mounted on a respective mounting ring 11 so that the frame assembly can be coaxially positioned on the work shaft and rotated thereabout. The open structure of the frame assembly increases the observation visibility of the machining process and reduces the gross weight of turning apparatus 10. The frame assembly can be assembled by securing flange pads 55 which are attached to spreader bars 13 and to drive rings 12 to one another by threaded screws.

Power to rotate the frame assembly is provided by a compound drive assembly mounted on drive rings 11. The compound drive assembly comprises dual drive assemblies, each assembly including a drive motor 14 operatively connected to a gear transfer assembly 15 which is, in turn, connected to a respective drive ring 12. The drive motors 14 are connected by a common drive linkage 16.

A telescoping longitudinal track assembly comprising rail subassembly 20 and bed retainer guide 29 is mounted between drive rings 12. Rail subassembly 20 is mounted at one end on a respective drive ring 12 by a mounting assembly comprising mounting plate 27 and end plate 28. Bed retainer guide 29 is in telescopic sliding engagement with the other end of rail subassembly 20 and is mounted on the other drive ring 12 by another mounting assembly comprising mounting plate 27 and end plate 28. As explained hereinbelow, the mounting assemblies may be adjusted to vary the aspect of the longitudinal axis of the track assembly with respect to the axis of the work piece so that cuts which are parallel or skewed to the work piece axis may be made. The telescopic design of guide assembly 29 and rail subassembly 20 allows contraction or expansion of the track assembly as required for a skewed machining operation. Threaded lead screw 21 is mounted on the track assembly and is also in telescopic sliding engagement with bed retainer guide 29.

A carriage assembly 22, slidably mounted on said assembly 20, is adapted to carry compound assembly 23 with attached cutter 19 for machining the work shaft. Carriage assembly 22 also includes retractable contact mechanism 24 for engagement of lead screw 21.

A mechanism to rotate lead screw 21 comprises master hydraulic apparatus 25 which is connected to slave hydraulic apparatus 26. As set out in greater detail hereinbelow, the lead screw rotation mechanism incrementally rotates lead screw 21 with each rotation of the frame assembly. The rotation of lead screw 21 moves carriage assembly 22 with cutter 19 along the axis of the work piece.

Figure 2:
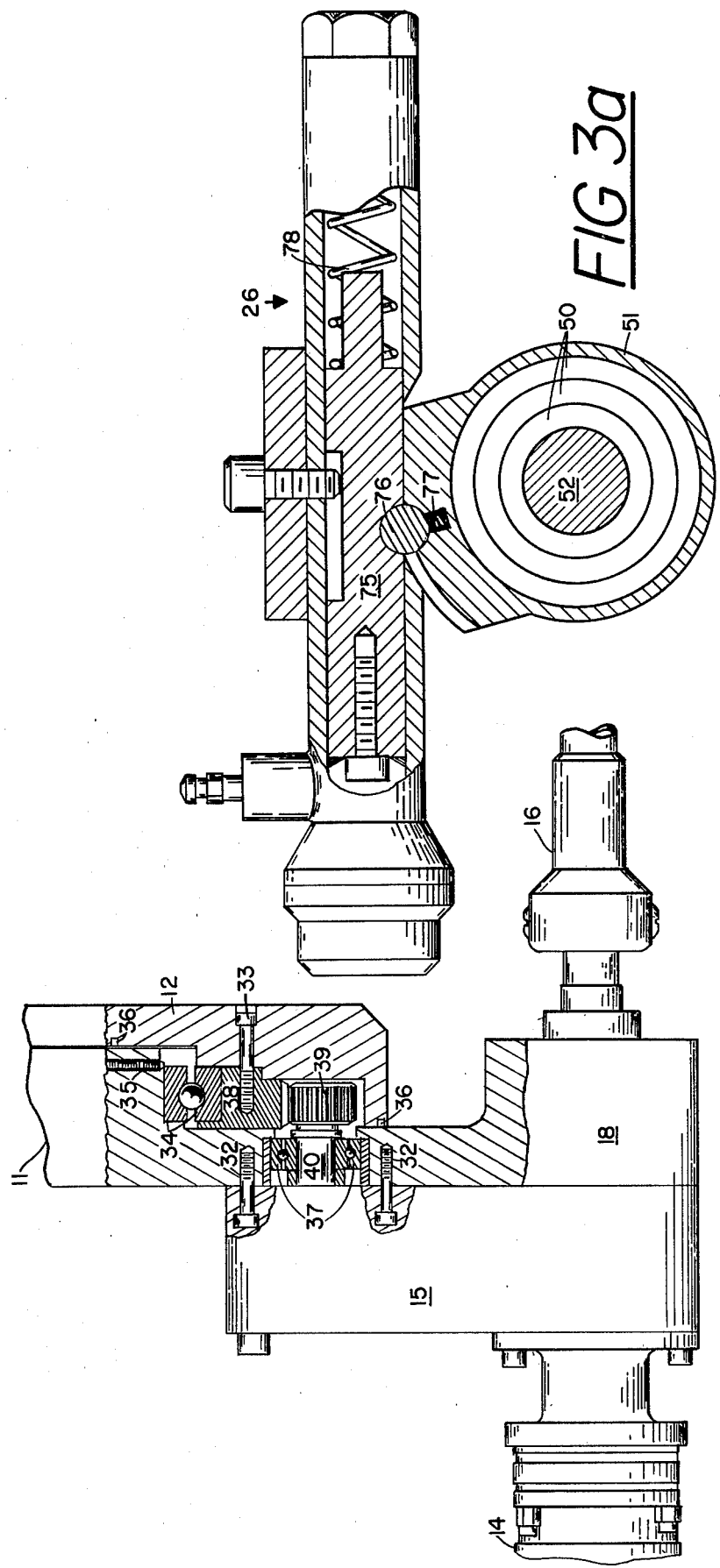
FIG. 2 is a partial vertical cross sectional view of a drive assembly mounted on a mounting ring and in operative contact with an end of the frame assembly.

As illustrated in FIG. 2, the means to drive the frame assembly includes electric drive motor 14 and transfer gear assembly 15. Drive motor 14 and gear transfer assembly 15 may be mounted in a flange 18 provided in mounting ring 11 and secured thereto by a series of bolts 32, two of which are illustrated in FIG. 2. Drive linkage 16 extends through an aperture of the flange 18 provided on mounting ring 11. Gear transfer assembly 15 has an output shaft 40 which extends through another aperture in the flange 18. Bearing assembly 37 provides slidable contact between shaft 40 and the flange aperture surface. Gear 39, mounted on output shaft 40, meshes with large diameter ring gear 38 which is radially aligned with and secured to drive ring 12 by means of a series of threaded cap screws 33, one of which is illustrated in FIG. 2. Mounting ring 11, drive ring 12, and ring gear 38 are adapted to engage ring bearing assembly 34, in radially aligned, slidable contact. Bearing assembly 34 is secured by a series of threaded set screws 35, one of which is shown in FIG. 2, which extend through an annular projection of mounting ring 11. The relationship between set screws 35 and bearing assembly 34 also furnishes the retaining force which holds drive ring 12 to mounting ring 11. Nylon wipers 36 provide closure between surfaces on drive ring 12 and mounting ring 11 for protecting bearing assembly 34 from dirt and debris.

Drive motor 14 sets up rotational forces which are transmitted through gear transfer assembly 15 to output shaft 40 and output gear 39. Output gear 39 drives ring gear 38 and the rotational force of ring gear 38 is transmitted to drive ring 12 which is part of the frame assembly. Bearing assembly 34 provides the slidable contact necessary to support the rotation of drive ring 12 relative to mounting ring 11. The dual drive assemblies function as a compound drive unit to rotate the frame assembly together with the track, carriage, and lead screw rotation assemblies around the axis of the work shaft. The rotation of the frame assembly provides the relative motion between cutter 19 and the work piece necessary for the machining operation.

Figure 3:
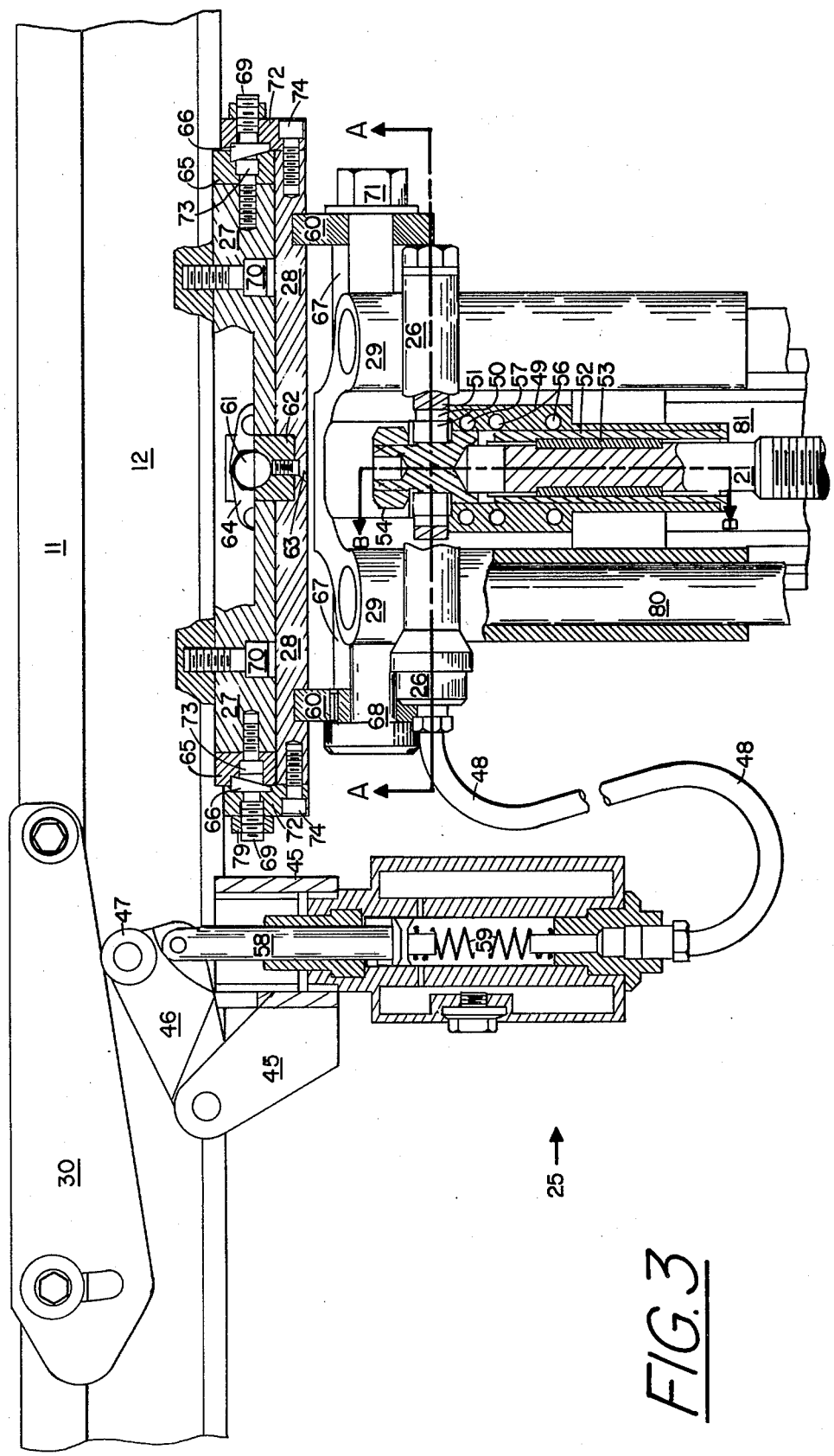
FIG. 3 is a partial vertical cross sectional view of an end of the track assembly mounted together with the lead screw rotating apparatus on an end of the frame assembly.
Figure 4A:
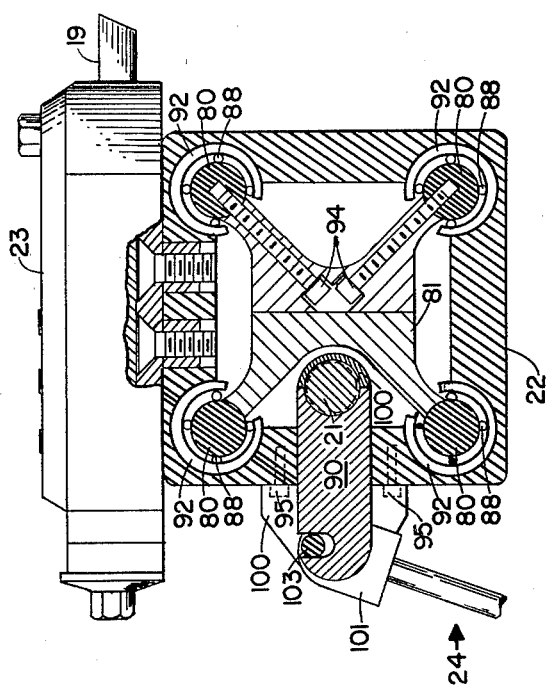
FIG. 4a is a horizontal cross section of the carriage assembly carrying a cutter, with the carriage assembly mounted on the track assembly and in an engagement with the lead screw.
Figure 4:
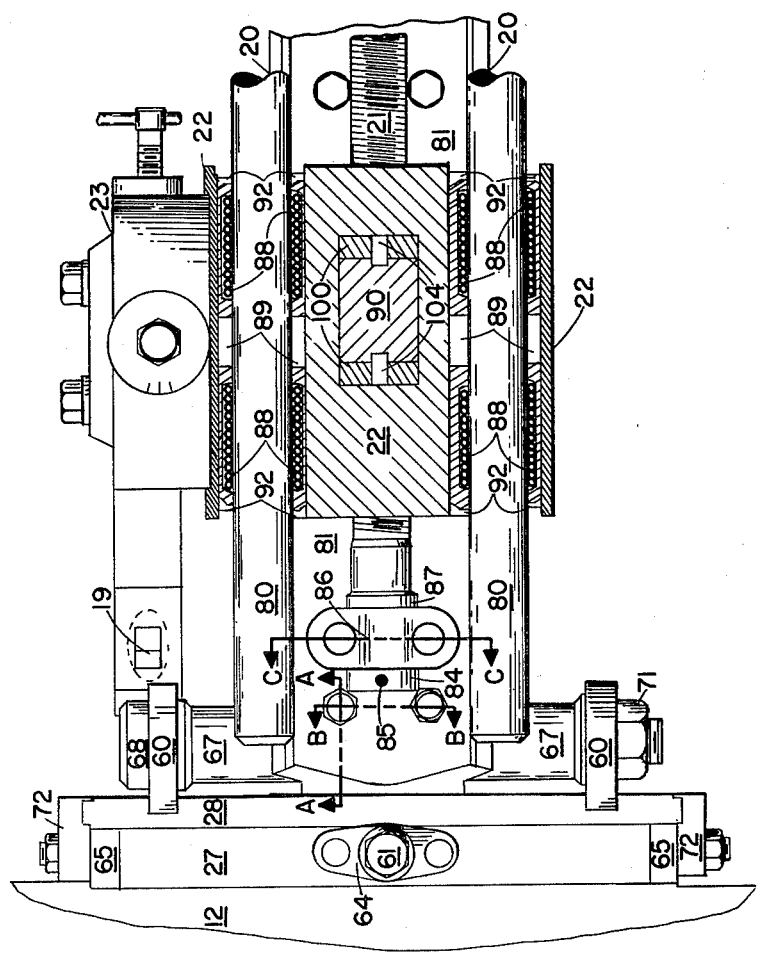
FIG. 4 is a partial vertical cross sectional view of the carriage assembly carrying the cutter with the carriage assembly mounted on the track assembly and in engagement with the lead screw.
Figure 4D:
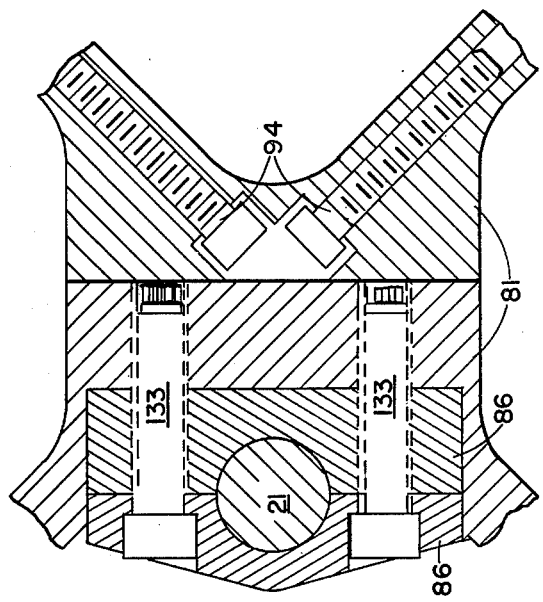
FIGS. 4b, 4c and 4d are enlarged sectional views taken along planes AA, BB and CC respectively of FIG. 4.
Figure 4C:
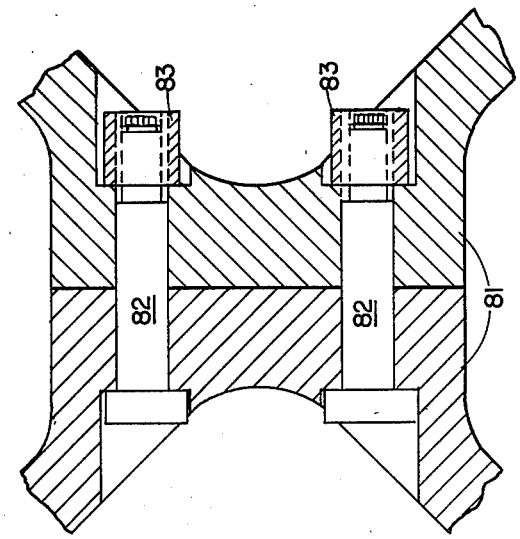
Figure 4B:
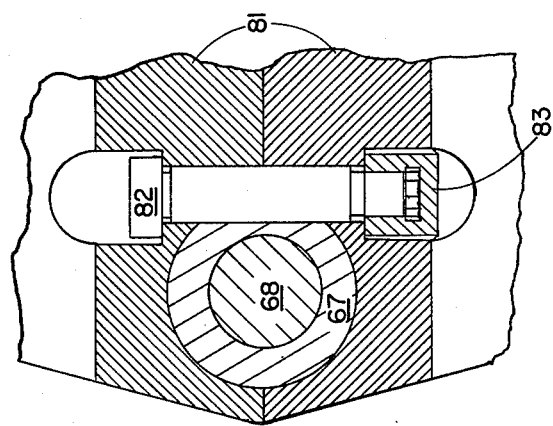

As illustrated in FIGS. 3, 4 and 4a, the track assembly consists of four ball bushing shafts 80, a bed 81, a bed retainer guide 29, two pivot pins 68, and two spacers 67, and is mounted on the frame assembly by means of two sets of height adjustment mechanisms which are explained in greater detail hereinbelow. The bed 81 may consist of two elongated, cast aluminum sections which are joined together by a series of set screws 82 and allen nuts 83 in the manner illustrated in FIGS. 4b and 4c; when the cast sections are joined, bed 81 forms a longitudinal quadrifid with four orthogonal wings as shown in FIG. 4a. The rail subassembly 20 is formed when one ball bushing shaft 80 is attached to each wing of bed 81 by a series of socket head cap screws 94 two each of which are shown in FIGS. 4a and 4d. Each bushing shaft 80 extends along the entire length of bed 81. As shown in FIGS. 4 and 4b, bed 81 is bored through one end to accept pivot pin spacer 67. At the other end of bed 81 the rail subassembly 20 is in telescopic, sliding engagement with bed retainer guide 29.

With reference to FIGS. 3 and 5, bed retainer guide 29 is seen to be a solid longitudinal quadrifid having four wings. Each wing has a cylinder with a longitudinal slot to accept a wing of bed 81 with an attached ball bushing shaft 80. Bed retainer guide 29 is also provided with a horizontally bored through hole on one end for a pivot pin spacer 67.

Pivot pin spacers 67 are centered, aligned, and welded into the holes provided in bed 81 and bed retainer guide 29. The rail subassembly 20 and retainer guide 29 are then positioned abreast to form a telescoping longitudinal track assembly with pivot pin spacers 67 at either end.

The track assembly comprising bed 81, bushing shafts 80, bed retainer guide 29, and pivot pin spacers 67 is mounted to the frame assembly by means of front and rear mounting/depth adjustment units illustrated in FIGS. 3 and 4. The mounting/depth adjustment units each consist of: drive ring mating plate 27, depth adjustment plate 28, guide nut 62, screw retainer 64, depth adjustment screw 61, a threaded bushing (not shown), guide plates 65, gibs 66, and end pieces 72. Each end of the track assembly is attached to a mounting bracket 60, which is welded to a depth adjustment plate 28, by means of a pivot pin spacer 67 and is secured in position by a pivot pin 68. Depth adjustment plate 28 is provided with a centered longitudinal recess to accept guide nut 62. Guide nut 62 is secured to adjustment plate 28 by two flat head screws 63 one of which is shown in FIG. 3. Guide nut 62 is threaded to mate with adjustment screw 61. A longitudinal slot is provided in drive ring mounting plate 27 within which guide nut 62 is designed to travel. Drive ring mounting plate 27 is secured to drive ring 12 by means of a series of threaded cap screws 70 two of which are shown in FIG. 3. Adjustment screw 61 is attached to mounting plate 27 and retained in position by a split adjustment screw retainer 64. The threaded portion of adjustment screw 61 extends into the longitudinal slot of mounting plate 27 and is secured thereto at its other end by a threaded bushing, not shown, which screws into the bottom of mounting plate 27. Guide plates 65 with bevelled notches are secured to either side of mounting plate 27 by means of a series of threaded cap screws 73 two of which are shown in FIG. 3. A gib 66 is held in frictional sliding engagement with the bevelled surface of each guide plate 65 by a series of threaded dog point socket head set screws 69, two of which are shown in FIG. 3. Set screws 69 are in engagement with threaded recesses provided in end pieces 72 and are locked in place by lock nuts 79. End pieces 72 are attached to depth adjustment plate 28 by means of a series of threaded cap screws 74, two of which are shown in FIG. 3.

Rotation of adjustment screw 61 will cause relative movement between adjustment screw 61 and guide nut 62, which will, in turn, cause depth adjustment plate 28 to move to or away from the axis of the work piece. Movement of depth adjustment plate 28 is transferred to the end of the track assembly to which it is connected by mounting brackets 60 and pivot pins 68. Torsional forces generated by movement of adjustment plate 28 are absorbed by the guide plates 65, end pieces 72, and gibs 66. When an end of the track assembly is in a desired position, the mounting/depth adjustment units can be locked into place by tightening dog set screws 69 which forces gibs 66 into tightened contact with guide plates 65. Manipulation of the mounting/depth adjustment units allows the track assembly to present a parallel or skewed aspect to the axis of the work piece for parallel or tapered cuts. Contraction or expansion of the track assembly required for mounting adjustment is provided by the telescopic engagement of the rail subassembly 20 with bed retainer guide 29.

As shown in FIG. 6, lead screw 21 is a longitudinal threaded shaft which transitions to a slotted smooth surface at end 91 and to a collared smooth surface at end 93. A hole is bored through collared end 93. Lead screw 21 is adapted to be mounted within a cleft formed by two wings of bed 81 as shown in FIGS. 4 and 4a. As described hereinbelow, the slotted end 91 of lead screw 21 is operatively engaged and telescopically mounted within a coupling provided on bed retainer guide 29. The end 93 with a hole is mounted on bed 81 by split bearing clamp 86 as illustrated in FIGS. 4 and 4d. The halves of split bearing clamp 86 fit together over collared end 93 of lead screw 21 and are fastened to bed 81 by threaded set screws 133. Thrust washer 87 is inserted between the collar on end 93 and bearing clamp 86.

Lead screw 21 is retained in bearing clamp 86 by roll pin 85 which is inserted through collar 84 and the hole in end 93.

The carriage assembly 22, illustrated in FIGS. 4 and 4a, is in the form of a quadrate apron structure with partial circular openings at the corners which fit around ball bushing shafts 80. Slidable engagement between carriage assembly 22 and ball bushing shafts 80 is provided by two sets of ball bearings 88 per bushing shaft 80. The pair of ball bearing assemblies 88 are inserted in each of the circular openings provided in the carriage assembly with spacer 89 in between and a retainer ring 92 on each end. A circumferential groove is provided at each end of each circular opening and carriage assembly 22 to seat retainer rings 92.

Figure 7:
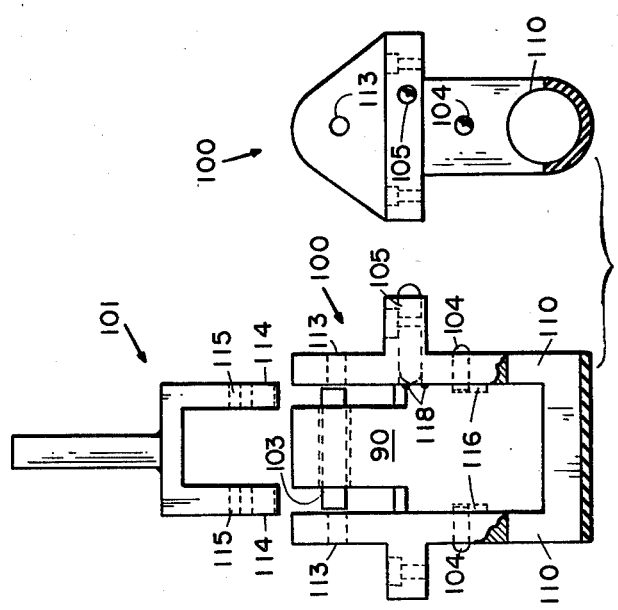
FIG. 7 is a front view of the lead screw engagement assembly and a side view of the U-bracket included in the assembly.

Mounted on carriage assembly 22 is lead screw engagement mechanism 24 which comprises U-bracket 100, half nut dog 90, fork lever 101, stop pins 104, engagement pin 103 and spring ball lock 105. The assembly and operation of the lead screw engagement assembly 24 can be understood with reference to FIGS. 4, 4a and 7. U-bracket 100 has holes 110 through both legs. The diameter of holes 110 is slightly larger than the major diameter of lead screw 21 and is designed to accept lead screw 21. Bracket 100 is inserted in a slot provided in carriage assembly 22 and is secured in position by means of a series of threaded socket head cap screws 95, two of which are shown in FIG. 4a. Half nut dog 90 fits between the legs of bracket 100 in a retractable position. Dog 90 is provided with a threaded concave surface at its lower end to synchromesh with the threads of lead screw 21. Dog 90 has a slot at its opposite end which is provided for slidable engagement with engagement pin 103. Intermediate the ends of dog 90 are slots 116. Stop pins 104 extend through holes in U-bracket 100 and into slots 116 of dog 90. Threaded spring ball lock 105 extends through a threaded hole in U-bracket 100. The rounded tip of ball lock 105 engages dog 90 by means of rounded depressions 118. Fork lever 101 has threaded holes 115 and holes 114 which extend transversely through each tine. Engagement pin 103 extends through holes 114. Pivot screws, not shown, are threaded on half of a shaft and engage fork lever 101 on their threaded portions in threaded holes 115. The pivot screws engage bracket 100 on their unthreaded portions in unthreaded holes 113.

With the interconnection described hereinabove, movement of fork lever 101 will cause it to rotate relative to U-bracket 100 on the pivot screws. Movement in one direction will cause the tines of fork lever 101 to move from between the legs of bracket 100 thereby drawing dog 90 by means of engagement pin 103 upward between the legs of bracket 100 away from engagement with lead screw 21. The movement of dog 90 will be stopped when the bottom surfaces of slots 116 come into contact with stop pins 104. Movement in the other direction will force dog 90 down between the legs of bracket 100 into engagement with lead screw 21. Downward movement of dog 90 is limited when the upper surfaces of slots 116 contact stop pins 104. Dog 90 is locked in position at both extremes by the engagement between the rounded surface of spring ball lock 105 and depressions 118.

When the dog 90 engages lead screw 21, the travel movement of carriage assembly 22 is governed by the incremental rotation of lead screw 21. When dog 90 disengages lead screw 21 travel movement of carriage assembly 22 is controlled manually and carriage 22 is free to travel in either direction. The disengaged position may be used to move carriage assembly 22 to a specific machining location.

With reference now to FIGS. 4 and 4a, cutter 19 is attached to a compound assembly 23 which is secured to carriage assembly 22. The compound assembly 23 provides continuous fine adjustment of the position of cutter 19 radially to the work piece. Compound assembly 23 is also adapted to lock cutter 19 into position. The rotation of the frame assembly about the axis of the work piece causes cutter 19 to circumferentially machine the surface of the piece.

Referring now to FIGS. 3, 3a, and 3b, the lead screw drive assembly comprises master hydraulic cylinder 25 mounted to drive ring 12 by bracket 45 to which also is pivotally mounted pivot arm 46. Roller 47 is rotatably mounted on pivot arm 46. Flexible fluid hose 48 provides a hydraulic connection between master cylinder 25 and slave cylinder 26. Slave cylinder 26 is mounted in an aperture of mounting bracket 49. Coupling 52 is mounted in another aperture of mounting bracket 49 perpendicular to the axis of slave cylinder 26. Cam clutch assembly 50 is radially aligned with and pressed onto the shoulder of drive coupling 52. Cam wheel 51 is, in turn, radially aligned with and pressed onto the outer diametrical surface of cam clutch assembly 50. Drive nut and washer assembly 54 provide retaining force to hold the cam clutch and wheel in place. Bracket 49 is anchored to guide assembly 29 by two dowels 57 and four threaded cap screws 56. Guide assembly 29 is mounted on a drive ring 12 according to the method explained hereinabove.

As shown in FIGS. 3a and 3b, the upper surface of cam wheel 51 rises to contact piston 75 contained in slave cylinder 26. An operational coupling is provided between the piston and the cam wheel by drive roller 76 which fits into respective notches in piston 75 and cam wheel 51. Tension spring 77 forces drive roller 76 to remain in constant contact with the notch in piston 75.

Referring to FIGS. 3 and 3b, it can be seen that drive coupling 52 has an axial bore with two diametrically opposed longitudinal slots provided therein. The diameter of lead screw 21 is reduced at end 91 to enable it to fit into the axial bore of coupling 52. A pair of diametrically opposed longitudinal slots are provided on the surface of end 91 of lead screw 21. An operational coupling is established between lead screw 21 and drive coupling 52 by keys 53 which fit into the slots on lead screw 21 and also extend into the slots in the bore of drive coupling 52. FIG. 3 shows keys 53 in the plane of the drawing; FIG. 3b shows them after rotation of coupling 52 by 90°.

The lead screw drive unit functions in conjunction with the rotational movement of the frame assembly. On each rotation, roller 47 provided on pivot arm 46 engages and travels on the cam of cam plate 30. Pivot arm 46 is thereby forced away from cam plate 30 which drives piston 58 of master cylinder 25 inwardly. This movement pressurizes the hydraulic fluid in cylinder 25 and forces it through flexible hose 48 into slave cylinder 26. The movement of piston 75 is transmitted by way of drive roller 76 to cam wheel 51. The movement of cam wheel 51 in the direction caused by the fluid-induced movement of piston 75 engages cam clutch 50 causing it to rotate. Rotation of cam clutch 50 causes coupling 52 to rotate. The operative coupling provided between coupling 52 and lead screw 21 by keys 53 causes lead screw 21 to rotate with the rotational movement of coupling 52. When pivot arm 46 travels beyond cam plate 30 the pressure it exerts on the hydraulic fluid on cylinders 25 and 26 is removed. Pistons 58 and 75 are returned to their initial positions by springs 78 and 59. Cam wheel 51 is returned to its original position by the movement of piston 75 transferred through drive roller 76; the direction of its return movement is opposite its movement in response to the hydraulic pressure. Cam clutch 50 is not engaged by the return movement of cam wheel 51 and no movement is transmitted to lead screw 21. The total rotation of lead screw 21 with each rotation of the frame assembly in the preferred embodiment is 38° clockwise. When lead screw engagement assembly 24 engages lead screw 21, this causes cutter 19 to move 0.021 inch along the axis of the work piece.

Figure 8:
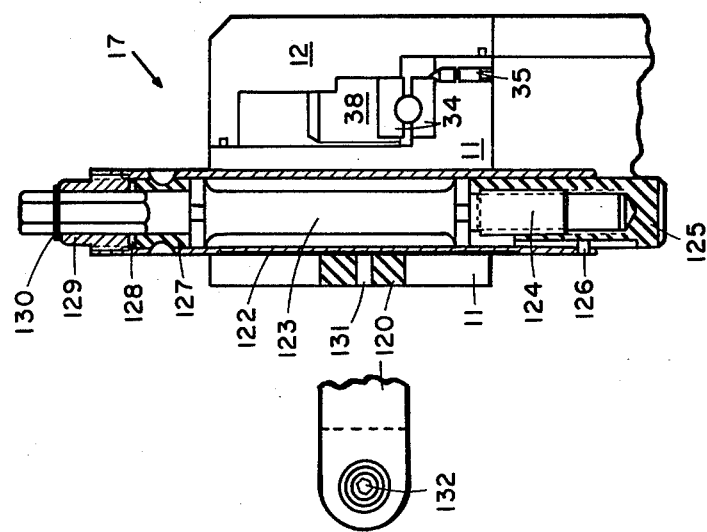
FIG. 8 is a vertical cross section of a mounting post assembly.

FIG. 8 illustrates a mounting post assembly 17, a series of which are attached to each mounting ring 11 by brackets 120 after being inserted in flanges 121. Each mounting post assembly 17 comprises cylindrical housing 122 adapted to slidably contain drive bolt 123 and mounting shoe 125. Extension 124 on the lower end of drive bolt 123 is threaded and engages a threaded cylindrical cavity provided in the center of mounting shoe 125. Mounting shoe 125 is also provided with a longitudinal slot on its surface into which extends pin 126 which is driven into a hole provided in the wall of housing 122. Drive bolt 123 has two flanges intermediate its ends to provide frictional contact with the inner surface of the wall of housing 122. Spreader 127 is placed between the top flange and hex washer 128. Lock nut 129, with threading on its outer circumferential surface to engage a threaded portion of the upper inner surface of housing 122, is placed between washer 128 and retainer ring 130 which fits into a circumferential groove also provided on the upper surface of mounting shoe 125. A longitudinal slot is provided on the outer surface of housing 122 to accept dowel pin 131 which extends through a hole in the peak of the rounded arch in bracket 120. Bracket 120 is held to mounting ring 11 by two threaded sockethead cap screws 132, one of which is shown on FIG. 8.

Mounting post assembly 17 is operated by turning drive bolt 123 which will force mounting shoe 125 to move along the axis of housing 122 to or away from the surface of the work piece depending upon the direction of rotation. When mounting shoe 125 is forced into contact with the work piece, the combination of drive bolt 123 and lock nut 129 will force housing 122 away from the piece until dowel pin 131 contacts the bottom of the longitudinal slot on the outer surface of housing 122. Tightening drive bolt 123 will force mounting shoe 125 into close holding contact with the work piece. Mounting post assembly 17 is locked into place when lock nut 129 is turned in a direction to force it against hex washer 128 which exerts a downward force on the upper flange of drive bolt 123.

Obviously, many modifications and variations of the present invention are possible in light of the above teachings, and, it is therefore to be understood that the invention may be practiced otherwise than as specifically described.

What is claimed is:

1. A turning apparatus for in-place machining of the surface of a shaft, comprising:
   a pair of mounting rings;
   radially adjustable means for mounting the rings on the shaft in a concentric spaced relationship thereto;

a longitudinal annulate frame assembly having opposite ends wherein each end is slidably mounted in a respective mounting ring so that the frame assembly can be coaxially positioned on the shaft and rotated;

drive means mounted on at least one mounting ring and operatively coupled to the frame assembly for driving the frame assembly;

a longitudinal track assembly mounted on and extending between the ends of the frame assembly for rotation therewith, said longitudinal track assembly including:

longitudinal support means having two ends and a plurality of longitudinal orthogonal projections;

a longitudinal bushing shaft attached to each projection; and retaining means on said frame assembly having a plurality of cylinders adapted for telescopic sliding engagement with the bushing shafts;

a lead screw rotatably mounted on the track assembly and extending between the ends of the frame assembly;

a carrying means mounted on the track assembly for slidable movement therealong and adapted to receive a cutter for machining the shaft;

means mounted on the carrying means for threaded engagement with the lead screw; and indexing means for incrementally rotating the lead screw in synchronism with the rotation of the frame assembly to thereby move the carriage assembly along the frame assembly.

2. The turning apparatus of claim 1 wherein the frame assembly comprises:

a pair of drive rings; and a plurality of spreading means attached to and extending between the drive rings to maintain them in a coaxial spaced relationship.

3. The turning apparatus of claim 2 wherein the frame assembly is operatively coupled to the drive means by a ring gear, the ring gear being attached to a drive ring and being in operative engagement with the drive means.

4. The turning apparatus of claim 3 further comprising means for mounting the track assembly on the ends of the frame assembly so that the track assembly can be skewed with respect to the axis of the work shaft whereby the work shaft can be machined by a parallel or tapered operation.

5. The turning apparatus of claim 4 wherein the track assembly mounting means includes:

a first attachment means pivotally attached to the support means and slidably mounted on a respective drive ring for radial movement thereon; and a second attachment means pivotally attached to the retaining means and slidably mounted on a respective drive ring for radial movement thereon.

6. The turning apparatus of claim 5 wherein the lead screw is rotatably mounted on the track assembly within a cleft formed by two longitudinal projections, one end of the lead screw being attached to the track assembly by a bearing means and the other end being in telescopic sliding engagement with a coupling means, said coupling means being mounted on said retaining means.

7. The turning apparatus of claim 6 wherein the carrying means is an apron assembly having a plurality of openings adapted for slidable engagement with the bushing shafts.

8. The turning apparatus of claim 7 wherein the lead screw engagement means includes:

a bracket assembly mounted on the apron assembly and extending therethrough;

an engagement shaft adapted to be slidably disposed within the bracket assembly, the engagement shaft having two ends, one end having a threaded concave surface for engaging the lead screw and the other end having a longitudinal slot; and a handle assembly having a first pivotal attachment to the bracket assembly and a second pivotal attachment to the engagement shaft slot;

whereby the engagement shaft is raised to disengage the lead screw when the handle assembly is rotated to one position and the engagement shaft is lowered to engage the lead screw when the handle assembly is rotated to another position.

9. The turning apparatus of claim 8 wherein the indexing means includes:

cam means attached to a mounting ring;

cam engagement means pivotally attached to a drive ring for periodically engaging the cam means when the frame assembly rotates;

a reciprocating hydraulic assembly attached to a drive ring and operatively connected to the cam engagement means for being activated when the cam is engaged thereby;

a clutch assembly fixedly attached to the coupling means engaging the lead screw and operatively connected to the hydraulic assembly for being rotatably driven thereby; and linkage means connecting the coupling means and the lead screw;

whereby upon rotation of the frame assembly the lead screw will be periodically rotated.

10. The turning apparatus of claim 9 wherein each mounting ring is concentrically attachable to the work shaft by a plurality of threaded dogs which are rotatably mounted on a mounting ring by brackets whereby each dog can be rotated in a bracket in one direction to contact the shaft and rotated in the other direction to draw away from the shaft.

* * * * *